W. P. BENNETT.
WINDMILL.
APPLICATION FILED FEB. 13, 1909.
985,131.
Patented Feb. 28, 1911.
2 SHEETS—SHEET 1.
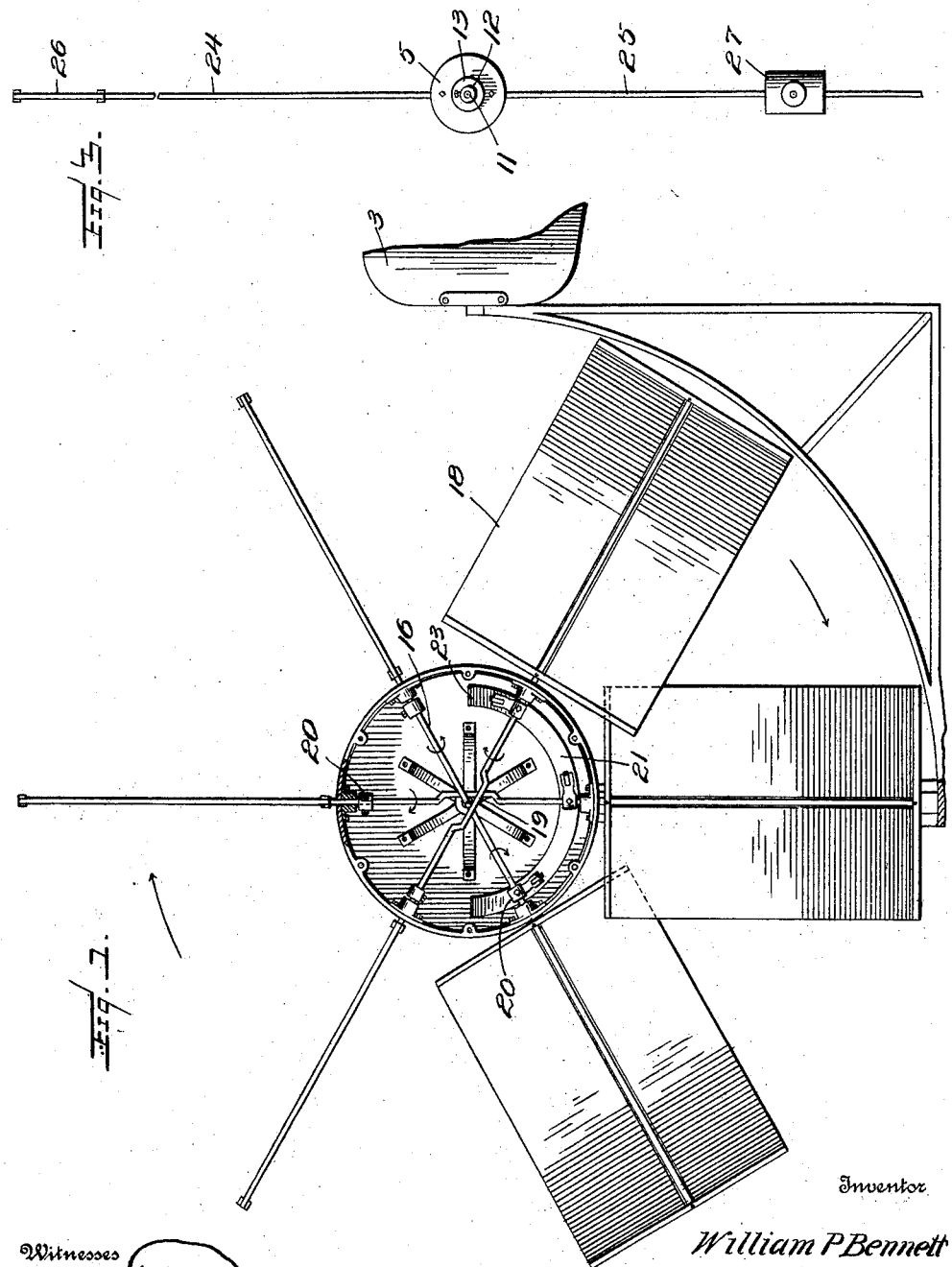

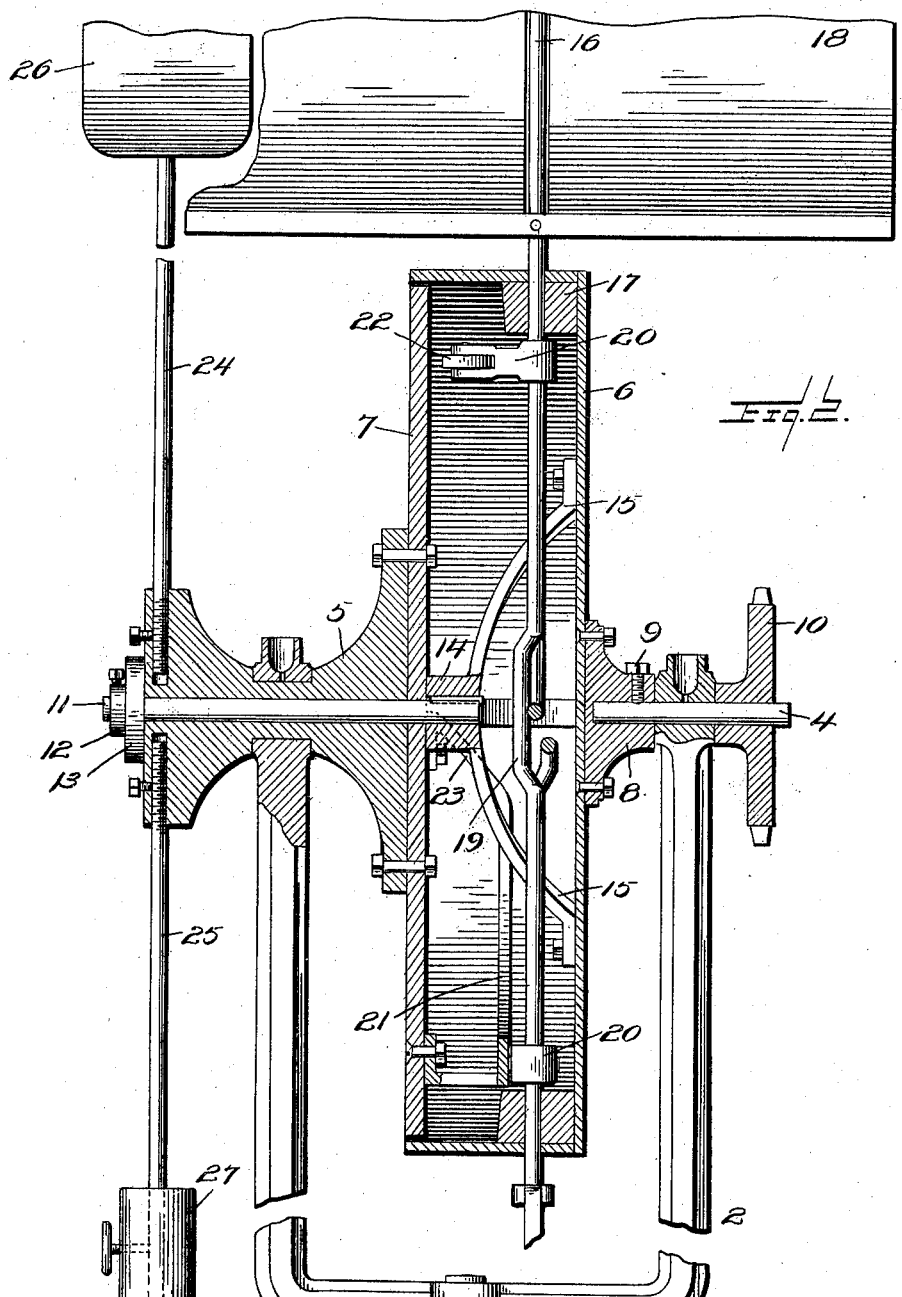

UNITED STATES PATENT OFFICE.

WILLIAM P. BENNETT, OF WOODSTOCK, OHIO.

WINDMILL.

985,131.   Specification of Letters Patent.   Patented Feb. 28, 1911.

Application filed February 13, 1909. Serial No. 477,568.

*To all whom it may concern:*

Be it known that I, WILLIAM P. BENNETT, a citizen of the United States, residing at Woodstock, in the county of Champaign and State of Ohio, have invented new and useful Improvements in Windmills, of which the following is a specification.

The purpose of the present invention is to utilize air currents in developing power to be used for operating machinery in the industrial arts.

In accordance with the invention, an engine has been devised embodying feathering blades mounted in a peculiar manner and automatically turned to present a maximum amount of surface for the wind to impact against or to offer a minimum amount of resistance when returning to an operative position according to the load or work to be performed and the velocity of the wind, whereby the engine may operate effectively both in a light breeze as well as in a high wind.

In the practical embodiment of the invention, the mechanism illustrated has been devised and the invention consists of the novel features, details of construction and combination of parts which hereinafter will be more particularly set forth and pointed out in the subjoined claims and shown in the drawings hereto attached, in which:—

Figure 1 is a front view of a wind mill embodying the invention. Fig. 2 is a vertical central section, a portion of the head and the upper part of the collar being shown in full lines. Fig. 3 is a front view of the governor.

Corresponding and like parts are referred to in the following description and indicated in all the views of the drawing by the same characters of reference.

The tower 1 for supporting the operating parts of the engine may be of any construction. The wind mill head 2 is forked as shown in Fig. 2 and is provided with a vane 3 for holding the engine in the wind. The head 2 is mounted upon the tower 1 so as to turn about a vertical axis thereby holding the active blades squarely in the wind. The fork members of the head 2 are supplied with bearings in which the rotating parts of the wind mill are mounted such as a section 4 of the shaft and a hub 5 forming a part of the casing.

The casing comprises two parts 6 and 7, the part 6 having a hub 8 and the part 7 provided with the hub 5. The section 4 of the shaft is secured to the hub 8 by means of a set screw 9 and is provided at its outer end with a sprocket wheel 10 from which power is taken to operate the mechanism to be driven. The section 11 of the shaft in line with the section 4 passes through the hub 5 and is provided at its outer end with a set collar 12 and washer 13. The inner end of the section 11 is secured in the hub 14 of a spider 15 which is fastened to the part 6 of the casing so as to rotate therewith and with the section 4. The parts 6 and 7 of the casing are mounted to have an independent rotary movement for the purpose presently explained.

A series of shafts 16 are mounted in bearings 17 attached to the casing part 6 and their end portions extend beyond the casing and are supplied with blades, paddles or wings 18. The blade 18 at one end of a shaft 16 is arranged about at a right angle to the blade secured to the opposite end of the same shaft, hence, when one blade is receiving the full force of the wind, the diametrically opposite blade is advancing in the wind to an operative position with its edge to the wind thereby offering a minimum amount of resistance. The shafts 16 are located in the same plane and in order to admit of one shaft clearing the other at the point of crossing, the middle portions are crimped or offset as indicated at 19. Arms 20 are made fast to the shafts 16 upon opposite sides of the axis of the engine and coöperate with a track 21 so as to properly position the blades. Each of the arms 20 has a small wheel 22 to minimize the frictional contact between the arms and track 21 when said arms are traveling over said track. The arms 20 fast to the same shaft have a right angular arrangement to each other so as to properly position the blades 18 in the operation of the engine. By preference, the arm 20 at each end of the shaft 16 is in a plane parallel with the blade 18 so that when the arm is turned into a position parallel with the current of air the adjacent blade is correspondingly turned to present its edge to the wind and thereby offer a minimum amount of resistance to the forward movement of the blade when returning to an operative position.

The track 21 is concentric with the axis of the casing and is substantially semi-circular and is fast to the section 7 of the casing to which the governor is attached. Opposite end portions of the track 21 incline as indicated at 23 thereby permitting the arms 20 to turn gradually both when entering upon and leaving the track. When the arms 20 are riding upon the track 21, the lowermost blades 18, or those returning to an operative position, move with their edges to the wind so as to offer a minimum of resistance.

The governor for controlling the relative position of the blade is applied to the hub 5 of the section 7 of the case and comprises rods 24 and 25 both secured at their inner ends to the outer portion of the hub 5. A vane 26 is attached to the outer end of the rod 24 and a weight 27 is adjustably mounted upon the rod 25. The weight 27 holds the vane 26 in the wind and the greater the distance of the weight 27 from the hub or axis of the windmill the greater the resistance of the vane 26 to the action of the wind. When the vane 26 occupies a perpendicular position the part 7 is located so that the track 21 is in an approximately horizontal position, with the result that the vanes receiving the force of the wind are caused to occupy a relative position to receive the effective force of the wind for a maximum length of time, but as the vane 26 moves from the perpendicular the part 7 and track 21 are correspondingly moved so that the vanes 18 are held in the wind for a less period of a revolution, hence a less amount of force of the wind is transformed into efficient work.

When the parts are assembled in a wind engine substantially in the manner herein disclosed, the wind wheel is held in the wind by the vane 3 and the position of the governor vane 26 with respect to the perpendicular is fixed by the weight 27. As the wheel rotates, the blades in position to receive the force of the wind, occupy a position at right angles to the direction of the wind and the blades returning to the operative position present their edges to the wind thereby offering a minimum amount of resistance to the movement of the blades as they pass from an inoperative to an operative position. Power may be taken from the engine in any manner preferably by means of the sprocket wheel 10. When the weight 27 is moved upon the rod 25 nearer to the axis of the wind wheel, the vane 26 may be moved from the perpendicular by a lighter wind under normal conditions the part 7 forming a support for the track 21 in an approximately horizontal position, as indicated in Fig. 1. When the wind increases so as to turn the vane 26 against the action of the weight 27 the support 7 is correspondingly turned and moves the track 21 from the normal position to a greater or less inclination depending upon the force of the wind, with the result that the blades feather or present their edges to the wind at a later period in the revolution of the wheel, thereby retarding the movement of the wheel and preventing racing thereof under a high wind. After the weight 27 has been set, the governor mechanism is automatic in action in adapting the engine to the velocity of the wind, thereby preventing damage in a gale and insuring performance of work in a comparatively light wind.

Having thus described the invention, what is claimed as new, is:—

1. In a wind engine, the combination of a rotary support, feathering blades mounted upon said support, a track, a rotary support for said track, and a governor device operated by direct action of the wind to move the last-mentioned support and change the relative position of the track to vary the point of feathering of the blades with reference to their revolution.

2. In a wind engine, the combination of a rotary support, radially disposed shafts mounted on said support, blades attached to the outer ends of said shafts, arms fast to said shafts, a track adapted to coöperate with said arms to turn the shafts and effect a feathering of the blades, and a governor having connection with said track and operated by direct action of the wind to vary the position of said track and change the point of feathering of the blades.

3. In combination, a two-part casing, feathering blades mounted in one part of the casing, a track carried by the other part of the casing and adapted to effect feathering of said blades, a hub connected with the part of the casing provided with the track, a governor device fitted to said hub and adapted to effect movement of the part of the casing connected thereto for shifting the relative position of the track, and a sectional shaft, the sections extended from the part of the casing supporting the feathering blades, and one of said sections being mounted in the hub of the section of the casing provided with the track.

4. In combination, a two-part casing, feathering blades mounted in one part of the casing, a track carried by the other part of the casing and adapted to effect feathering of the blades, a hub projected from the part of the casing provided with the track, a spider attached to the part of the casing supporting the feathering blades, a sectional shaft, one of the sections secured to said spider and mounted in the afore-mentioned hub, and a governor device attached to the hub of the part of the casing provided with the track.

5. In combination, a wind mill head, a two-part casing mounted upon said head, feathering blades mounted in one part of the casing, a track attached to the other part of the casing and adapted to effect feathering of the blades, a spider secured to the part of the casing carrying the feathering blades, a shaft section attached to said spider and mounted concentric with and adapted to turn independently of the part of the casing provided with the track, a governor connected with the part of the casing provided with the track, and a governor vane connected with the wind mill head to hold the engine in the wind.

In testimony whereof I affix my signature in presence of two witnesses.

WILLIAM P. BENNETT.

Witnesses:
 CHARLES A. CUSHMAN,
 DANIEL S. POLING.

---

Copies of this patent may be obtained for five cents each, by addressing the "Commissioner of Patents, Washington, D. C."